(12) United States Patent
Syse et al.

(10) Patent No.: US 8,171,960 B2
(45) Date of Patent: May 8, 2012

(54) PLUG WITH GRIPPING MEANS

(75) Inventors: Harald Syse, Røyneberg (NO); Jostein Aleksandersen, Randaberg (NO)

(73) Assignee: TDW Offshore Services AS, Stavanger (NO)

( * ) Notice: Subject to any disclaimer, the term of this patent is extended or adjusted under 35 U.S.C. 154(b) by 1171 days.

(21) Appl. No.: 11/909,390

(22) PCT Filed: Feb. 3, 2006

(86) PCT No.: PCT/NO2006/000047
§ 371 (c)(1),
(2), (4) Date: Nov. 16, 2007

(87) PCT Pub. No.: WO2006/101398
PCT Pub. Date: Sep. 28, 2006

(65) Prior Publication Data
US 2010/0051130 A1 Mar. 4, 2010

(30) Foreign Application Priority Data
Mar. 21, 2005 (NO) .................................. 20051478

(51) Int. Cl.
*F16L 55/10* (2006.01)
(52) U.S. Cl. .......................................................... 138/89
(58) Field of Classification Search ....................... 138/89
See application file for complete search history.

(56) References Cited

U.S. PATENT DOCUMENTS

| | | | | |
|---|---|---|---|---|
| 1,949,498 A * | 3/1934 | Stone et al. | ............. | 166/113 |
| 2,870,794 A * | 1/1959 | Thaxton | ............. | 138/90 |
| 2,974,685 A * | 3/1961 | Ver Nooy | ............. | 138/90 |
| 3,011,555 A * | 12/1961 | Clark, Jr. | ............. | 166/122 |
| 3,886,977 A * | 6/1975 | Dorgebray | ............. | 138/89 |
| 3,943,982 A * | 3/1976 | Lecordier | ............. | 138/89 |
| 4,465,104 A | 8/1984 | Wittman et al. | | |
| 5,014,782 A * | 5/1991 | Daspit | ............. | 166/120 |
| 5,146,994 A * | 9/1992 | Pleasants et al. | ............. | 166/387 |
| 6,241,424 B1 | 6/2001 | Bath et al. | | |
| 7,124,779 B2 | 10/2006 | Syse | | |
| 2004/0168734 A1* | 9/2004 | Serret | ............. | 138/89 |
| 2005/0241710 A1* | 11/2005 | Early et al. | ............. | 138/89 |

FOREIGN PATENT DOCUMENTS

| | | |
|---|---|---|
| GB | 2286868 | 8/1995 |
| NO | 316740 | 12/2003 |

OTHER PUBLICATIONS

Int'l Search Report, May 8, 2006, Plugging Specialists Intl.
Written Opinion of ISA, May 8, 2006, Plugging Specialists Intl.

* cited by examiner

*Primary Examiner* — James Hook

(74) *Attorney, Agent, or Firm* — Gable Gotwals

(57) ABSTRACT

The present invention regards a plug (2) for scaling off a pipeline (1), comprising a main body (3), scaling means (6) and gripping means (5) arranged circumferentially around the main body (3) and actuation means (4) for operating the sealing and gripping means (5,6) where the gripping means (5) comprise at least one slip (10) with an outer surface (11) for contact against the pipe wall and an inner gliding surface (12) arranged in abutment against a first angled guiding surface (21), forming an angle ? with a center axis of the plug (2), so that the gripping means (5) when actuated is moved relative to the guiding surface (21) to move the slips (10) in a radial direction where the guiding surface (21) in addition is moved in a radial direction relative to the center axis of the plug (2).

14 Claims, 7 Drawing Sheets

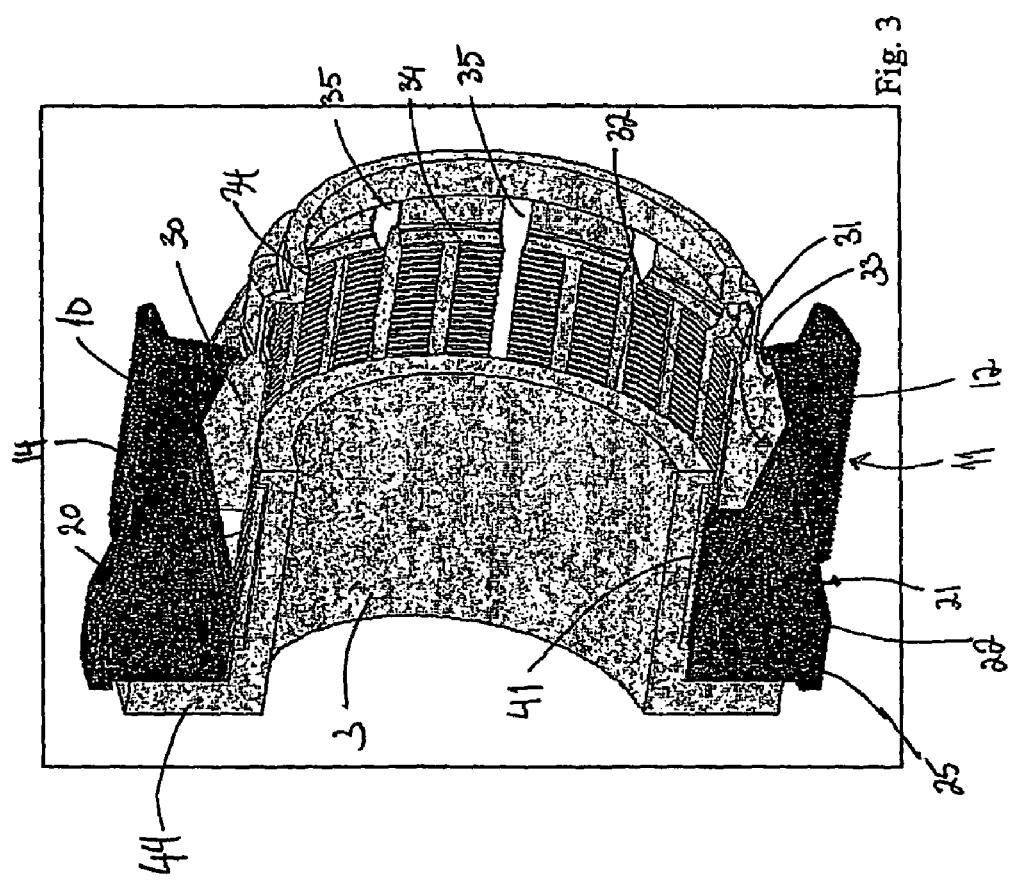

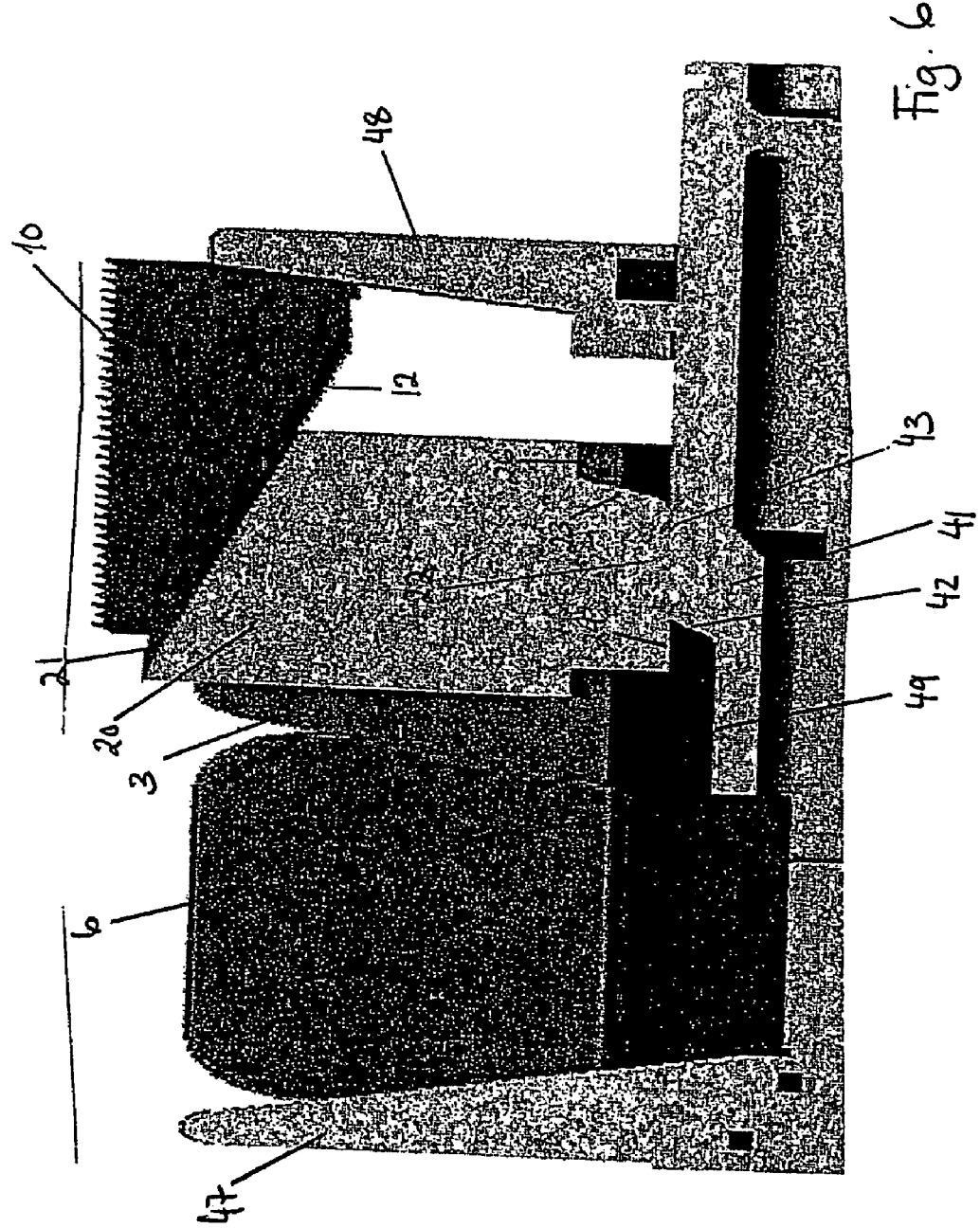

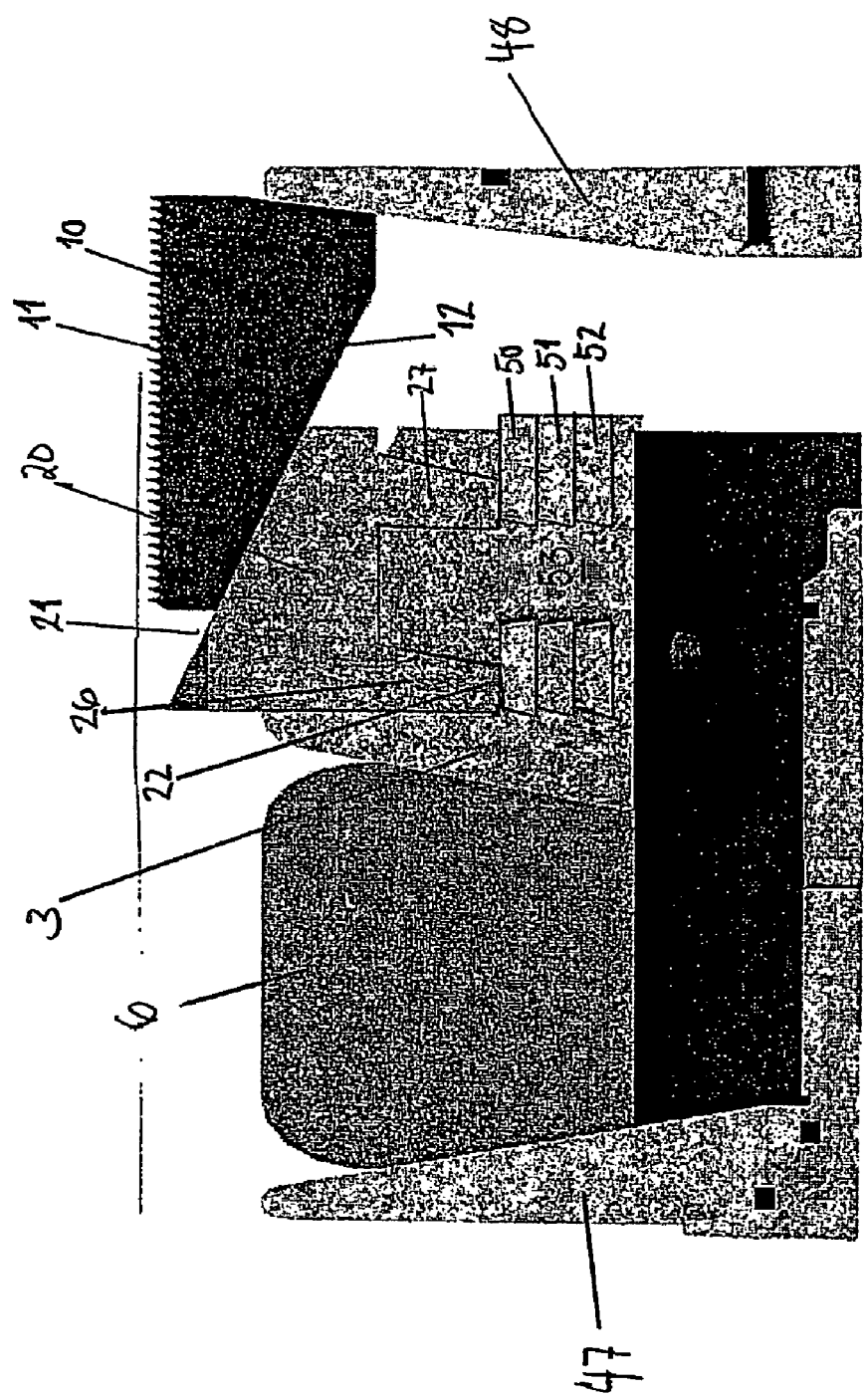

PLUG WITH GRIPPING MEANS

Figure 1:
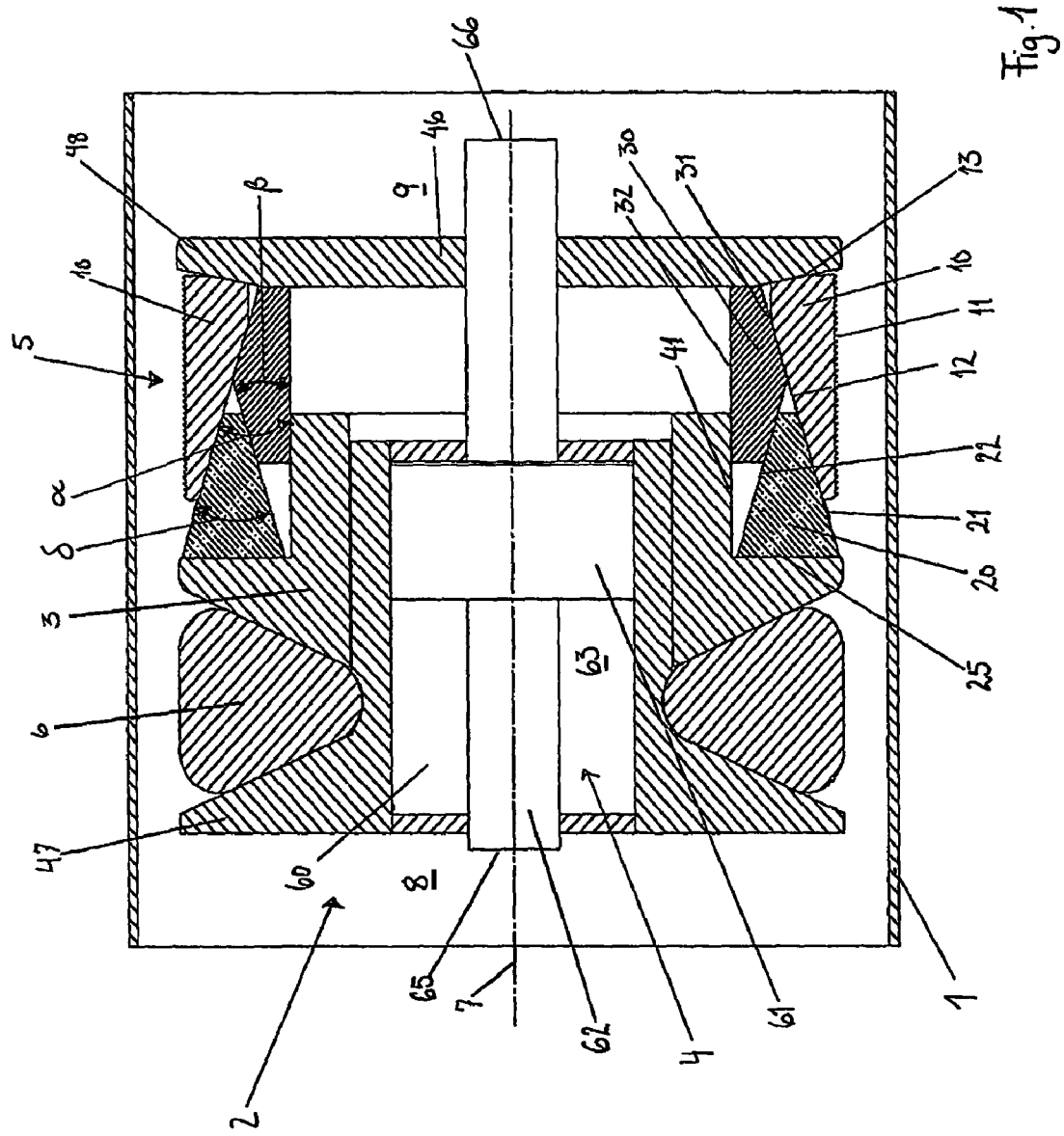

The present invention relates to a plug comprising a main body, gripping and sealing means for sealing off a pipeline and actuation means for actuating the gripping and sealing means. The plug may be set in a pipeline of varying diameter.

There is a general need for having the ability of sealing off a part of a pipeline, for performing repair or maintenance, adding or removing different equipment in the pipeline, branching off or generally closing the pipeline. The pipeline may be a pipeline for any kind of fluids, for instance a pipeline for hydrocarbon fluids or a water pipe. Traditionally pipelines have been designed to include valves at certain intervals along the pipeline to have the ability to close down parts of it. However, with pipelines at large depths of water, and long distance pipelines it is not so favourable to have preinstalled valves, they first have to be activated at the spot and when a valve has not been used for several years one may not be able to use the valve. Another issue is that having valves at certain intervals in a pipeline increases the loss in pressure in the pipeline in addition to increasing the cost of the pipeline. Instead of these valves at site one may use removable plugs, which are inserted into the pipeline, taken to the necessary position, set in the pipeline to seal it off so one can perform the necessary tasks and thereafter removed. These plugs may favourably be remotely operated to avoid the problems with feed and control lines.

In a situation of closing off a gas/oil pipeline it is of most importance that the plug is configured in an easy and reliable way, so no unforeseen problems arises during a procedure. Any unnecessary downtime will be costly.

A plug which should seal off pipelines must also be configured so that is may pass bends and other obstructions in the pipeline and at the same time be able to seal against an inner diameter of the pipeline. This inner diameter of a pipeline may vary quite much along the pipeline and the obstructions in forms of valves and other equipment may have a much smaller inner diameter than the rest of the pipeline, setting restrictions for the outer diameter of the plug. In remotely operated plugs which may travel several kilometers before they are set, it is of most importance to have a plug that passes all difficult positions in the pipeline during its travel, this may in addition to the ones mentioned above also be for instance corrosion, build up of debris in the pipeline, etc.

All this gives the need for a plug which has an outer diameter in an unset position, "hard outer diameter", which is as small as possible and which at the same time has an outer diameter in a set position which is as large as possible. To be able to navigate bends it is also important to keep the length of the plug as short as possible. Such a configuration is most favourable, since the plug then has a large range of use.

Another issue is with temporarily set plugs, which after use in one pipeline shall be removed and thereafter used in another pipeline. The possibility of varying the outer diameter for a set position would be favourable since one plug then may be used in a larger range of dimensions of the inner diameters of pipelines.

These issues are especially important for the gripping means, which usually comprises hard elements for gripping the wall of the pipeline and holding the plug in its position until the sealing means have sealed the position and the pressure is released on one side of the plug for building a differential pressure across the plug for self locking the plug in the pipeline.

There is in Norwegian patent 316740 described one solution for moving a gripping means of the plug from a relative small outer diameter in an unset position to a relative larger outer diameter in a set position of the plug, while keeping the same length of the plug. The gripping means are in the form of slips arranged around the circumferential of a main body of the plug and moved along an angled surface by an actuation mean from a retracted position to a set position. The actuation means is in the form of a centrally located hydraulic cylinder. The slips are formed as so called "jumping slips" in that they in an initial movement from the retracted, unset position, is moved along a first surface with a first angle and thereafter along a second surface with another angle, the first surface moving the slips relatively quicker outward in a radial direction than the second surface. One problem with this solution is that the slips may not be set against an internal wall of a pipeline as long as the slips are moved along the first surface with the larger angle since the angle is to large for the purpose of self locking of the slips.

In GB 2 286 868 it is described a solution for locking slips in a set position of a plug. This solution uses the pressure in the pipeline fluid, to press a small part of the angled surface for moving the slips, a little further in a radial direction. This however does not give an increased use for the plug, since it is just a locking system.

It is an aim of the present invention to provide a plug which has a solution for moving the gripping means of the plug from a small outer diameter in an unset position to a relative large outer diameter in a set position and at the same time not increase the length of the plug.

It is also an aim to provide a plug which may be set with a large variation in outer diameters.

Yet another aim is to provide a plug which may be set in any position of the gripping means during their relative axial movement for obtaining radial movement.

It is also an aim to provide a plug comprising a few numbers of parts, which is reliable, easy to maintain and repair.

Another aim is to provide a plug with large variations in outer diameter in a set position while at the same time keep a low self locking differential pressure across the plug.

These aims are achieved with a plug according to the invention as defined in the enclosed independent claims, and preferable embodiments of the invention are given in the dependent claims.

The present invention regards an arrangement at a plug or a plug for sealing off or plugging a pipeline. The plug comprises a main body, sealing means and gripping means arranged circumferentially around the main body and actuation means for operating the sealing and gripping means from a retracted position to an extended position, for gripping and sealing against an internal wall of the pipeline. The plug also comprises other equipment for operating the plug, as for instance a remotely operable control system, eventual fluid supplies, wheel or guide arrangements, elements for pigging the plug in a pipeline, etc. These elements are however not essential parts of the present invention and will therefore not be explain in any more detail. A skilled person will also understand and be able to choose these elements. The actuation means may have several configurations, it may be a motor operating the gripping means mechanically, it may be an eccentric arrangement operated by a motor or a fluid cylinder arrangement either gas of hydraulically operated. There may be one centrally located hydraulic cylinder or several or one for operating the gripping means and one for operating the sealing means. As it can be understood there are several thinkable actuation means which may work with the present invention.

According to the invention the gripping means comprise at least one slip element with an outer surface for contact against the internal pipe wall and an inner gliding surface arranged in abutment against a first angled guiding surface, forming an angle α with a centre axis of the plug. When the gripping means are actuated from a retracted position, the slip elements are moved relative to the guiding surface and thereby moved in a radial direction for anchoring of the plug. According to the invention the guiding surface, and by this one means the whole guiding surface, is in addition moved in a radial direction relative to the centre axis of the plug.

According to a first aspect of the invention, the first guiding surface is arranged on the outer surface of at least one first wedge element, which first wedge element comprises a second inner surface in abutment against a second guiding surface, which second inner surface is formed with an angle β in relation to the centre axis of the plug.

Preferably the second guiding surface is formed by at least one second wedge element with a third inner surface mainly parallel to the centre axis and in abutment against a main body surface.

According to a preferred embodiment of the first aspect of the invention, the first guiding surface and the second inner surface of the wedge element form in a cross section in the longitudinal direction of the plug, an acute angle δ, where the open side of the angle δ is faced against a high pressure side of the plug, when the plug is set. Preferably the angle α formed by the first guiding surface and the central axis of the plug and the angle β formed by the second guiding surface and the central axis are mainly equal, but angles facing opposite directions of the centre axis of the plug.

According to a second aspect of the invention the second guiding surface of the second wedge element and second inner surface of the first wedge element and or the third inner surface of the second wedge element and the main body surface are formed with at least two portions with different angles in relation to the central axis, forming a step function.

According to a third aspect of the invention at least one insert element may be introduced between the main body and a wedge element. The wedge element and the insert elements are formed with corresponding surfaces, which may in one embodiment comprise at least two portions with different angles in relation to the centre axis, to be able to move the insert element in between the wedge element and the main body. One may choose just one or all of the insert elements depending on the internal diameter of the pipeline in question at set location.

In a preferred embodiment of the plug it comprises two main sections, a high pressure section and a low pressure section, which are moved relative to each other by the actuation means in the form of a main hydraulic cylinder, to set the gripping means. The high pressure section comprises the cylinder chamber of the hydraulic cylinder, and the low pressure section is connected to the piston rod and piston head of the hydraulic cylinder. The low pressure section comprises a plate element in abutment against a part of the slip element, moving the slip element in relation to the first guiding surface. The plate element is in one embodiment also in abutment against a part of the second wedge element. The second wedge element may be moved in different manners as explained below.

According to a fourth aspect of the invention the second wedge element or the wedge element in abutment against the main body surface is moved relative to the main body surface by a second hydraulic cylinder. In a preferred embodiment, the second hydraulic cylinder is an annular cylinder in connection with the main hydraulic cylinder. The second hydraulic cylinder may also have its own independent fluid supply.

The invention also regards a method for setting a plug. The method comprises inserting the plug in the pipeline, sending the plug to the setting position, when at setting position activating the setting procedure by moving the guiding surface in a radial direction and moving the slips relative to the guiding surface.

According to another aspect of the method it comprises moving the guiding surface in a radial direction before the slips are moved relative to the guiding surface.

Figure 2:
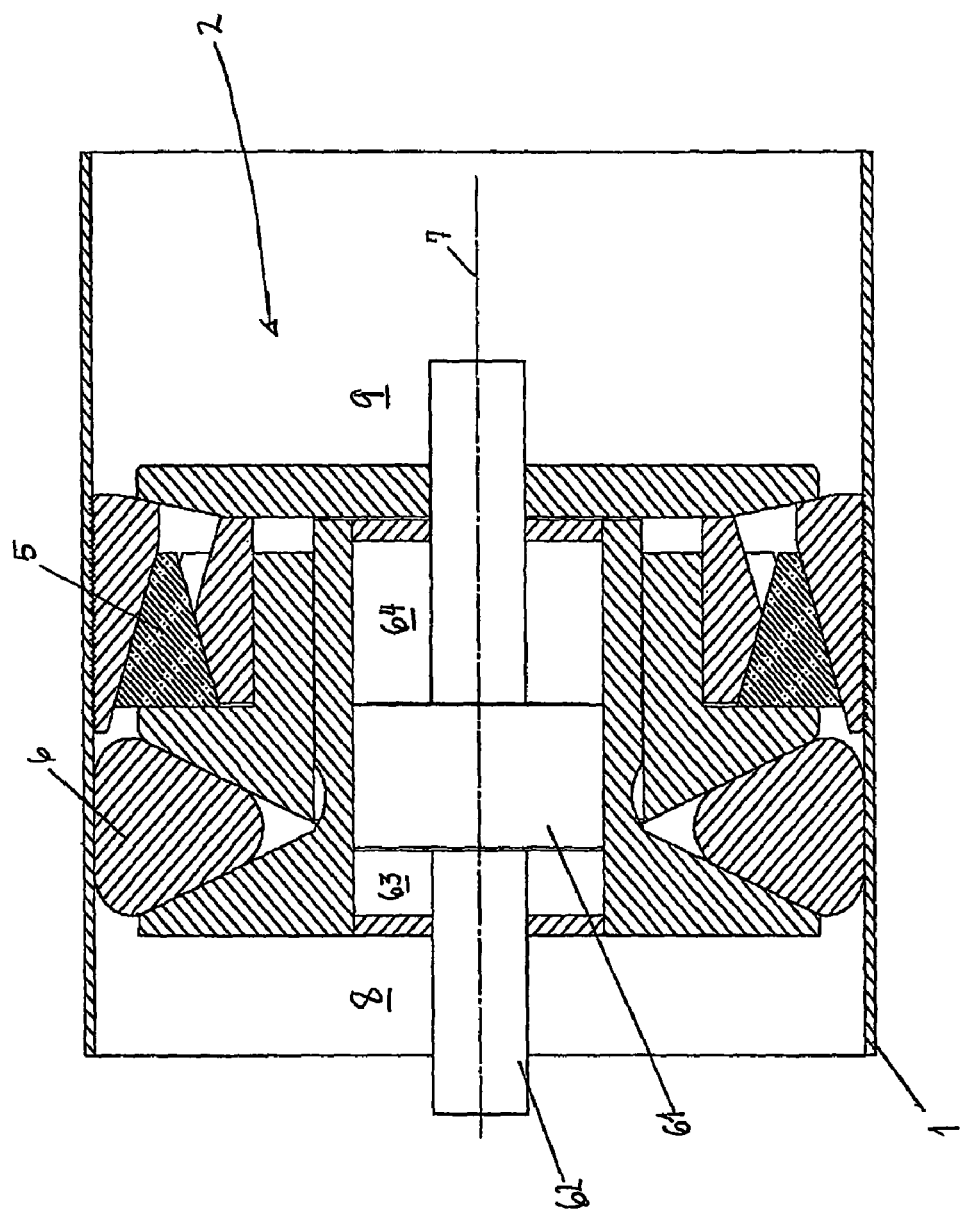
Figure 4B:
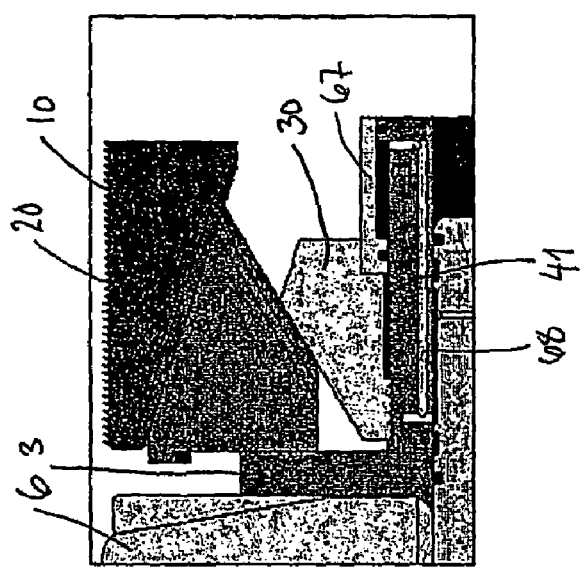
Figure 4A:
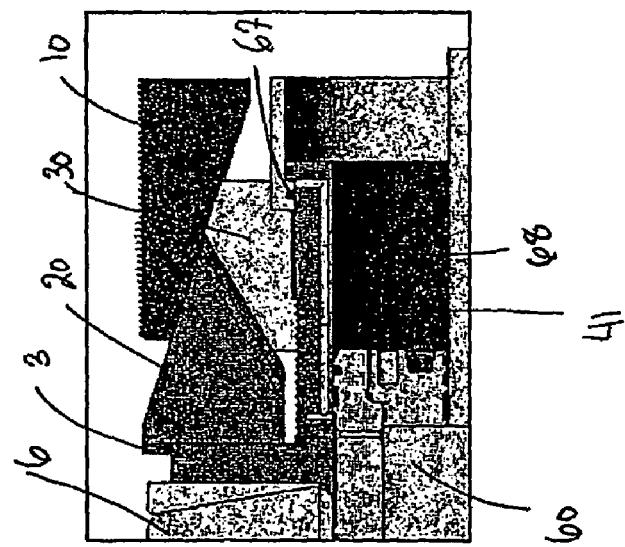
Figure 5:
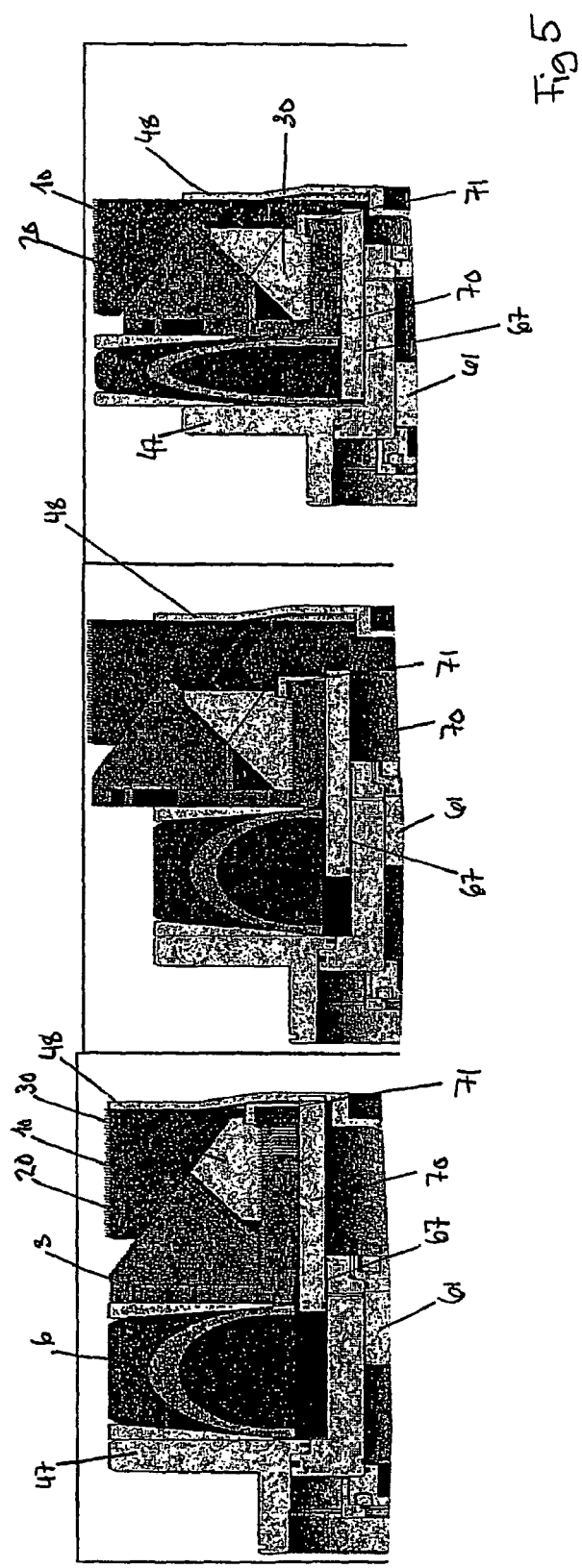

The invention will now be explained, with a detailed description of several embodiments of the invention and with references to the drawings, where:

FIG. 1 depicts a cross section through the main elements of a plug according to a first embodiment of the invention in an unset position in a pipeline, FIG. 2 depicts a cross section of the embodiment of FIG. 1 in a set position of the plug, FIG. 3 shows as elevated sketch of details related to the gripping means of the embodiment of FIG. 1, FIGS. 4 A and B shows cross sections of details of second embodiment of the invention in a set and unset position, FIG. 5 shows sequences of the setting procedure of a third embodiment of the invention, FIG. 6 depict a cross section of a fourth embodiment, and FIG. 7 depicts a detail of a fifth embodiment of the invention.

For clarity similar elements in the different embodiments are given the same reference numerals.

In FIG. 1 it is shown a cross section through the main elements of a plug according to a first embodiment of the invention in an unset position in a pipeline, FIG. 2 is depicting a set position of the plug. The plug 2 is positioned in a pipeline 1 and comprises a main body 3, which is mainly cylindrical. Around the circumference of the main body 3 there is arranged gripping means 5 and sealing means 6, which in FIG. 1 are in an unset position and an outer diameter of the plug therefore equals a minimum outer hard diameter for the plug 2. The gripping and sealing means 5,6 are actuated from an unset position to a set position by actuation of the actuation means 4, which in this embodiment comprises a centrally located hydraulic cylinder. The main body 3 is divided in two sections a high pressure section 45 and a low pressure section 46. The high pressure section 45 forms internally cylinder chambers 63, 64 of the hydraulic cylinder. A piston rod 62 and a piston head 61 are situated in the chamber and dividing it and connected to the low pressure section 46 of the main body 3.

The low pressure section 46 also comprises a low pressure plate 48 which has an outer diameter mainly equal to the hard outer diameter of the plug. In a similar manner comprises the high pressure section 45 a high pressure plate 47. The plates 47, 48 are moved relatively towards each other by the hydraulic cylinder 4 when hydraulic fluid is added to the cylinder chamber 64 moving the piston head 61 relatively towards the high pressure plate 47, sweeping the cylinder chamber 63, during the setting of the plug 2. This movement causes movement of the gripping means 5 and the sealing means 6 radial outward and into contact with the internal wall of the pipeline 1. This will be explained in more detail below.

The sealing means 6 in the form of an annular sealing element is pushed into contact with the internal wall of the pipeline 1, by a shifting movement radial outwards by the movement of an angled surface of the high pressure plate 47 and an opposite angled surface of the main body 3 moving toward each other by the actuation means 4. It is here referred to the applicants own co-pending Norwegian Patent No. 322727, which is hereby included by reference, for further explanation.

The gripping means 5 comprises slip elements 10 arranged around the circumference of the main body 3. There are a number of slips 10 arranged around the circumference, the number depending, among other things, on the size of the plug. The slips 10 all have an outer surface 11 for interaction with the internal wall of the pipeline 1. The outer surface 11 may comprise protrusions, teeth, ribs, coating or other means for enhancing the gripping effect of the slips on the internal wall of the pipeline 1. The slips further have an internal gliding surface 12, for movement of the slips relative to the main body 3 of the plug during the setting procedure of the plug. The internal gliding surface 12 is an angled surface in relation to the centre axis of the plug. A cross section in the longitudinal direction of the plug gives a mainly triangular shaped form of the slips with a largest radial distance between the outer surface 11 and the internal gliding surface 12 closest to the low pressure plate 48. The slips 10 are in this embodiment connected to the low pressure plate 48 by corresponding T-shaped grooves (not shown) in the low pressure plate 48 and an end side 13 of the slips, connecting the outer surface 11 with the inner gliding surface 12. The end side 13 and the corresponding part of the low pressure plate 48 are formed with a small angle in relation to a radial direction.

The slips gliding surface 12 glides on a first guiding surface 21, in this embodiment formed by a first wedge element 20 with a second inner surface 22. The first guiding surface 21 and the second inner surface 22 are both angled surfaces in relation to the centre axis of the plug, which gives a cross section of the first wedge element 20 in a longitudinal direction of the plug, with the largest distance between the first guiding surface 21 and the second inner surface 22 furthest from the low pressure plate 48, which end forms an end side 25. The end side 25 is in abutment with a part of the main body 3. The first wedge element 20 is also connected to the main body 3 by for instance T-shaped corresponding grooves/protrusions in the end side 25 and the corresponding surface of the main body 3.

The first wedge element 20 with the second inner surface 22 is in abutment against a second wedge element 30, with a second guiding surface 31. The second wedge element 30 with a third inner surface 32 is in abutment against a main body surface 41, which is mainly parallel to the centre axis of the plug. The second wedge element is in this embodiment, also in abutment against the low pressure plate 48.

These surfaces form several angles. The first guiding surface 21 and the second inner surface 22 of the first wedge element 20, form an angle δ with the open side of the angle faced towards the high pressure plate 47. The second guiding surface 31 forms an angle β relative to a central axis of the plug, the first guiding surface 21 forms an angle α relative to a central axis. These two angles α and β are in the embodiment shown mainly equal but facing opposite direction of the longitudinal axis of the plug.

Now referring to FIG. 1 and FIG. 2, when the plug is actuated from an unset, FIG. 1, to a set, FIG. 2, position in the pipeline, the hydraulic cylinder will due to the adding of hydraulic fluid to the second chamber 64 move the piston head 61 from right to left on the figures, and thereby move the two plates 47, 48 towards each other. The low pressure plate 48 will thereby press the slips 10 and also the second wedge element 30 towards the high pressure plate 47, or with other words, in an axial direction in relation to the centre axis and relative to the first wedge element 20. The second wedge element 30 with its mainly axial inner surface 32 will move in a mainly axial direction. The first wedge element 20 will be moved outwards in a radial direction by the second inner surface 22 gliding relative to the angled second guiding surface 31 of the second wedge element 30, as this second wedge element 30 is moved axially. The slips 10 will be moved radial outwards by the axial relative movement of the first inner gliding surface 12 in relation to the first guiding surface 21 of the first wedge element 20. Since the first wedge element 20 with its first guiding surface 21 also itself is moved outwards in a radial direction, the slips 10 will by its relative axial movement, move outward in a radial direction equal to the relative movement of the slips 10 in relation to the first wedge element 20 in addition to the relative radial movement of the first wedge element 20 itself. This relative radial movement of the slips 10 equals the relative radial difference between an imaginary start and stop point of the relative movement performed on both the first and the second guiding surfaces 21, 31. The orientation of both guiding surfaces 21, 31, makes it possible to lock the slips 10, at any point along its movement relative to the first guiding surface 21. By this one gets a double radial movement of the slips 10 with the same axial movement of high and low pressure plate 47,48 in relation to each other, in other word with the same sweeping length of the piston head 61 of the hydraulic cylinder. This means a larger radial movement with the same length of the plug.

Details of this embodiment are also shown in FIG. 3, where it is given a perspective cross section view of part of the main body 3 with the body surface 41, the second wedge element 30, several first wedge elements 20 and two slip elements 10. There will be slip elements 10 arranged around the whole circumference of the body 3. FIG. 3 shows the elements 10, 20, 30 in a retracted position of the slip elements 10. As one may see the second wedge element 30 is in the form of a ring element with the third inner surface 32 in abutment against the body surface 41. The second wedge element 30 is formed as a ring, since the element only is moved in a mainly axial direction and not moved in a radial direction. The third inner surface 32 is formed with rows of protrusion 34, as ribs or teeth for biting into the body surface 41 which may be formed with corresponding protrusions, rib or teeth, when the plug is in a set position. The second wedge element 30 is also formed with a cutback surface 33 to give room for the slips 10 in a retracted position and several silts 35 in a mainly axial direction, running from one end of the ring and to a distance away from the other end of the ring for instance for saving weight and achieving some flexibility in the second wedge element 30, since it in a set position should be presses against the main body while it in and unset situation should be moved along the main body 3.

The main body 3 is formed with the body surface 41 and also with a body flange 44 for abutment against the end side 25 of the first wedge element 20. The first wedge element 20 comprises of several separate element arranged around the circumference of the main body 3. The first wedge element 20 is in form of elements in order to be able to be moved in a radial direction, and they are as mentioned above connected to the body flange 44 by mainly radial T-shaped corresponding tongue and groove systems (not shown), these systems may also limit the movement on the first wedge element 20 in a radial direction, to prevent failure.

In abutment around the first wedge element 20 there are shown two wedge formed slip elements 10, there will however be slip elements arranged around all the circumference of the main body. The slip elements 10 have protrusions 14 in their outer surface 11, for a better grip with the internal wall of the pipeline. The slip elements alternatively referred to as slips 10 may by for instance T-shaped tongue and groove systems be connected to the low pressure plate 48, see FIGS. 1 and 2.

In FIGS. 4A and 4B there are shown details of another embodiment of the invention, in an unset position in FIG. 4A and set position in FIG. 4B. This embodiment also comprises slips 10, a first wedge element 20 and a second wedge element 30, which second wedge element 30 is moved along a mainly axial body surface 41. The slips 10 are as in the previous embodiment moved with the movement of the piston head 61 and low pressure plate 48 (not shown). The difference in this embodiment is the additional second hydraulic cylinder 67, in the form on an annular hydraulic cylinder, with a fluid line 48 running from the main hydraulic cylinder 60 for adding fluid to the second hydraulic cylinder 67. The second hydraulic cylinder may move the second wedge element 30 separately in an initial axial movement before the slips 10 are move in relation to the first wedge element 20.

In FIG. 5 there is shown three pictures of the details of a third embodiment in three positions during a setting procedure, unset, middle and set, from left to right. This embodiment is quite similar to the previous two embodiments, and for similar element it is referred to the description above. The difference here is also in the additional second hydraulic cylinder 67, comprising a cylinder sleeve 70 and at an end of this cylinder sleeve 70 a cylinder flange 71. The cylinder flange 71 is in abutment with or connected to a part of the second wedge element 30. When adding fluid to the second hydraulic cylinder 67, which fluid may come from the chamber of the first hydraulic cylinder, as discussed in relation to FIG. 4 or from another source through a tube or pipe, the cylinder sleeve 70 will be moved relative to the body 3 and thereby also move the second wedge element 30, without moving the slips 10 in an axial direction, as shown in the middle picture of FIG. 5. Both the first wedge element 20 and the slips 10 will by this be moved in a radial direction. The actuation of the main hydraulic cylinders piston head 61, will move the low pressure plate 48 relative to the body 3 and thereby move the slips 10 in a relative axial direction, which also causes a radial movement of the slips 10 due to the angled guiding surface of the first wedge element 20, as indicated in the right picture of FIG. 5. By this one gets the double radial movement of the slips as also explained above.

In FIG. 6 there is shown a fourth embodiment of the invention. The plug comprises as in the previous embodiments a main body 3 with a high pressure section with a high pressure plate 47 and a low pressure section with a low pressure plate 48. There is centrally in the plug a hydraulic cylinder as previous described. There are sealing means 6 and gripping means actuated by the hydraulic cylinder. The gripping means comprises slips 10, as in the previous embodiments, and a first wedge element 20, with a first guiding surface 21 in abutment against a first inner gliding surface of the slips 10.

The first wedge element 20 has in this embodiment, a second inner surface 22 in abutment against a body surface 41. The body surface 41 and the second inner surface 22 comprises three surface portions with different angles, the body surface 41 by the first body surface portion 42, the second body surface portion 43 and the third body surface portion 49, where the first body surface portion 42 forms a larger angle with a centre axis of the plug than the second and third body surface portions 43, 49. In a similar manner the second inner surface 22 has a first step surface portion 23, a second step surface portion 24 and a third step surface portion 26, with similar angular relationships as the portions of the body surface 41. By having this step formed shape of the surfaces 22, 41, the first wedge element 20 will in a part of its relative axial movement be moved outwards in a radial direction by the "steps" and thereby also move the first guiding surface 21 for the slips 10 outwards in a radial direction during the setting procedure, and thereby having the ability to move the slips 10 outwards in a radial direction for a larger distance with the same sweeping of the piston head.

A fifth embodiment of the invention is shown in FIG. 7. This embodiment gives another possibility for moving the first guiding surface 21 outwards in a radial direction. There are arranged at least one insert element 50 for insertion between the first wedge element 20 and the body 3. In the figure there are shown three insert elements 50, 51, 52. The insert elements 50, 51, 52, and the first wedge element 20 are formed with corresponding parts 26, 27 and apertures 53 with angled surfaces to be able to insert only one or all of the insert elements. There will also be an insert system (not shown) for moving the insert element from an inactive to an active position, and arrangements in the low pressure plate 48 for not activating inactive insert elements when setting the plug. One may by this arrangement insert one or several elements between the first wedge element 20 and the body 3, dependent on the internal diameter of the pipeline in which the plug should be set. The insertion of the insert elements 50, 51, 52 may be remotely done at the setting point.

There are now explained several arrangements for achieving the present invention of moving the guiding surface for the slips in a radial direction during the setting procedure. There may be envisaged other arrangements within the scope of the invention as defined in the following claims. There may be arrangements with combinations of the arrangements described above. The second wedge elements may have a step function, there may be four wedge elements for achieving a quadruple radial movement of the slips, there may be two or more main hydraulic cylinders for actuating the sealing and gripping means, there may be different hydraulic cylinders for actuating the sealing and gripping means, the hydraulic cylinder may be gas operated instead of hydraulic operated cylinder. The sealing means may be of any suitable kind of sealing means, the plug may have cable feed or preferably be remotely operated. The plug may be part of a plug chain.

The invention claimed is:

1. A plug for sealing off a pipeline, said plug comprising:
a main body;
a seal around the main body;
at least one slip with an outer surface for contact against a pipe wall and an inner gliding surface arranged in abutment against a first angled guiding surface, forming an angle α with a center axis of the plug; and
an actuator for operating the seal and the slip from a retracted position to an extended position, for gripping and sealing against the pipe wall so that the slip when actuated is moved relative to the guiding surface to move the slip in a radial direction, and the guiding surface in addition is moved in a radial direction relative to the center axis of the plug.

2. The plug according to claim 1, further comprising the first guiding surface is arranged on an outer surface of at least one first wedge element, wherein the first wedge element has a second inner surface in abutment against a second guiding surface, which second inner surface is formed with an angle β in relation to the center axis of the plug.

3. The plug according to claim 2, further comprising the first guide surface and the second inner surface of the first wedge element forming an acute angle δ, wherein the open side of the angle δ is faced against a high pressure side of the plug, when the plug is set.

4. The plug according to claim 2, further comprising an angle α formed by the first inner gliding surface and the center axis of the plug and the angle β formed by the second guiding surface and the center axis are approximately equal but facing opposite directions.

5. The plug according to claim 2, further comprising a second guiding surface formed by at least one second wedge element with a third inner surface mainly parallel to the center axis and in abutment against a main body surface.

6. The plug according to claim 5, further comprising the second guiding surface of the second wedge element and second inner surface of the first wedge element or the third inner surface of the second wedge element and the main body surface are formed with at least two portions with different angles in relation to the center axis.

7. The plug according to claim 1, further comprising at least one insert element between the main body and a wedge element.

8. The plug according to claim 7, further comprising an insert element and a wedge element each having a corresponding portion with at least two surfaces with different angles in relation to the center axis.

9. The plug according to claim 1, said main body comprising:
   a high pressure section and a low pressure section, which are moveable relative to each other by the actuator in the form of a main hydraulic cylinder;
   wherein the high pressure section forms a cylinder chamber of the hydraulic cylinder, and the low pressure section connect to a piston head and a piston rod of the hydraulic cylinder.

10. The plug according to claim 9, said low pressure section comprising a plate element in abutment against a part of the slip, moving the slip in relation to the first guiding surface.

11. The plug according to claim 10, further comprising the plate element in abutment against a second wedge element.

12. The plug according to claim 11, further comprising the second wedge element being moveable along the main body by a second hydraulic cylinder.

13. The plug according to claim 12, said second hydraulic cylinder comprising an annular cylinder in connection with the main hydraulic cylinder.

14. A method for setting a plug comprising:
   inserting the plug in a pipeline;
   sending the plug to the setting position;
   activating a setting procedure by moving a guiding surface in a radial direction relative to the plug;
   moving one or more slips relative to the guiding surface;
   extending a seal in a radial direction relative to the center axis of the plug; and
   moving the guiding surface in a radial direction before the slips are moved relative to the guiding surface.

* * * * *